United States Patent [19]

Simons et al.

[11] 4,355,349
[45] Oct. 19, 1982

[54] LIGHTING UNIT

[75] Inventors: Ronald H. Simons, Bishops Stortford; Basil S. Wilkinson, Waltham Cross, both of England

[73] Assignee: Thorn Emi Limited, London, England

[21] Appl. No.: 168,241

[22] Filed: Jul. 10, 1980

[30] Foreign Application Priority Data

Jul. 12, 1979 [GB] United Kingdom ............... 7924352

[51] Int. Cl.$^3$ .............................................. F21S 1/02
[52] U.S. Cl. .................................. 362/153; 362/231; 362/293; 362/359; 362/390
[58] Field of Search ............... 362/293, 369, 390, 145, 362/153, 231

[56] References Cited

U.S. PATENT DOCUMENTS 3,007,034 10/1961 Reed et al. ........................ 362/153

FOREIGN PATENT DOCUMENTS 2065349 7/1971 France .
2353016 12/1977 France .
 560974  4/1944 United Kingdom .
 879611 10/1961 United Kingdom .

Primary Examiner—Stephen J. Lechert, Jr.
Attorney, Agent, or Firm—Fleit & Jacobson

[57] ABSTRACT

A lighting unit for a glide path lighting system comprises a light source, a lens, and a colored interference filter part way across the light path between the light source and the lens, arranged so as to produce a light beam having a white part, a colored part and a transition region. The filter is inclined at an angle of approximately 6° to a plane normal to the optical axis of the unit.

8 Claims, 2 Drawing Figures

LIGHTING UNIT

The present invention relates to a lighting unit for use in a glide path lighting system.

Various glide path lighting systems are known which give to the pilot of an aircraft a visual indication of his angle of approach to the runway when landing. Some of these systems use lighting units which appear to change from white to a colour (usually red) if the aircraft drops below a certain angle of approach. These lighting units, set for different angles of approach, can define upper and lower limits of a glide path for the aircraft and will indicate by the appropriate colour change any deviation from this glide path. It is important in this system that the observed transition region between seeing white light and seeing coloured light should occur over as small an angle range as possible so as to give rapid warning of any deviation from the glide path.

The lighting units commonly used in the above system comprise a lens, a light source on the optical axis of the lens, and a coloured filter positioned part way across the light path between the light source and the lens. This produces a beam of light divided into a coloured part and a white part with a transition region formed by the combination of some light rays which have passed through the filter with other light rays which have not. With conventional absorption filters there are various problems including difficulty in obtaining a uniform colour throughout the filter. An alternative is a dichroic or interference filter which comprises a plurality of optically thin layers of material deposited on the surface of a supporting transparent substrate. These layers produce interference effects which combine to reflect unwanted wavelengths and transmit only the required colour. The interference filter easily gives the required uniformity of colour over its surface and has the added advantage that the substrate can be made much thinner than a comparable absorption filter, thus narrowing the transition region. However, it is found that with an interference filter the coloured part of the transmitted beam is partly desaturated by white light so that the overall improvement is reduced.

According to the invention there is provided a lighting unit for a glide path lighting system comprising,
a lens,
a light source positioned on the optical axis of the lens,
a planar interference filter extending part way across the light path between the light source and the lens and inclined at an angle to a plane normal to the optical axis,
and means for supporting said lens, light source and filter in their respective position.

The lighting unit may include a transparent plate and further supportive means for supporting the plate in front of the lens, which plate is also inclined at an angle to a plane normal to the optical axis of the lens.

The front plate may be inclined in an opposite sense to the filter.

The angle of inclination of the filter may be less than 8° and may preferably lie between 4° and 8°.

A lighting unit constructed in accordance with the present invention will now be described, by way of example only, with reference to the accompanying drawings of which:

Figure 1:
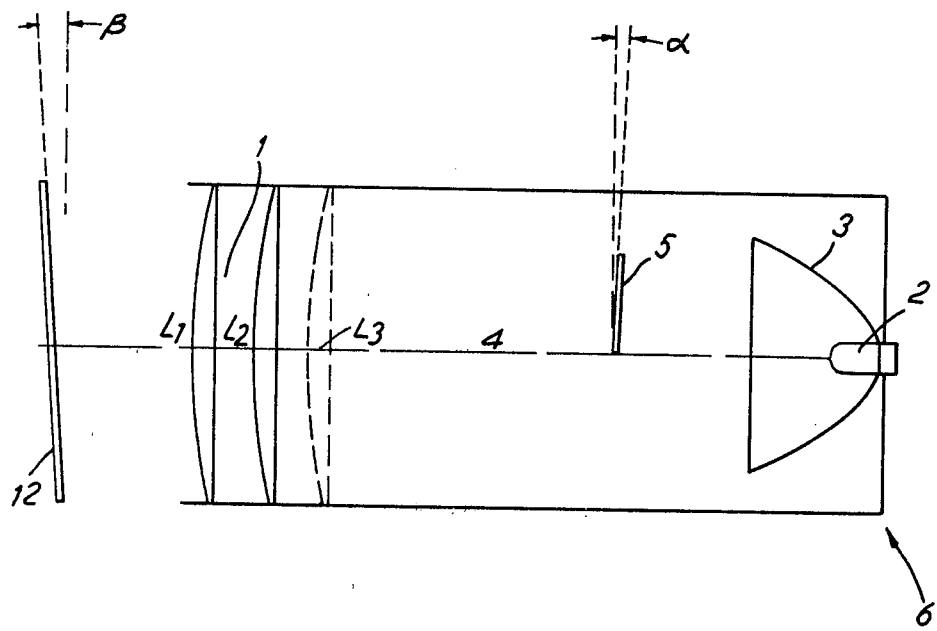
FIG. 1 shows a schematic side elevation view of the lighting unit.
Figure 2:
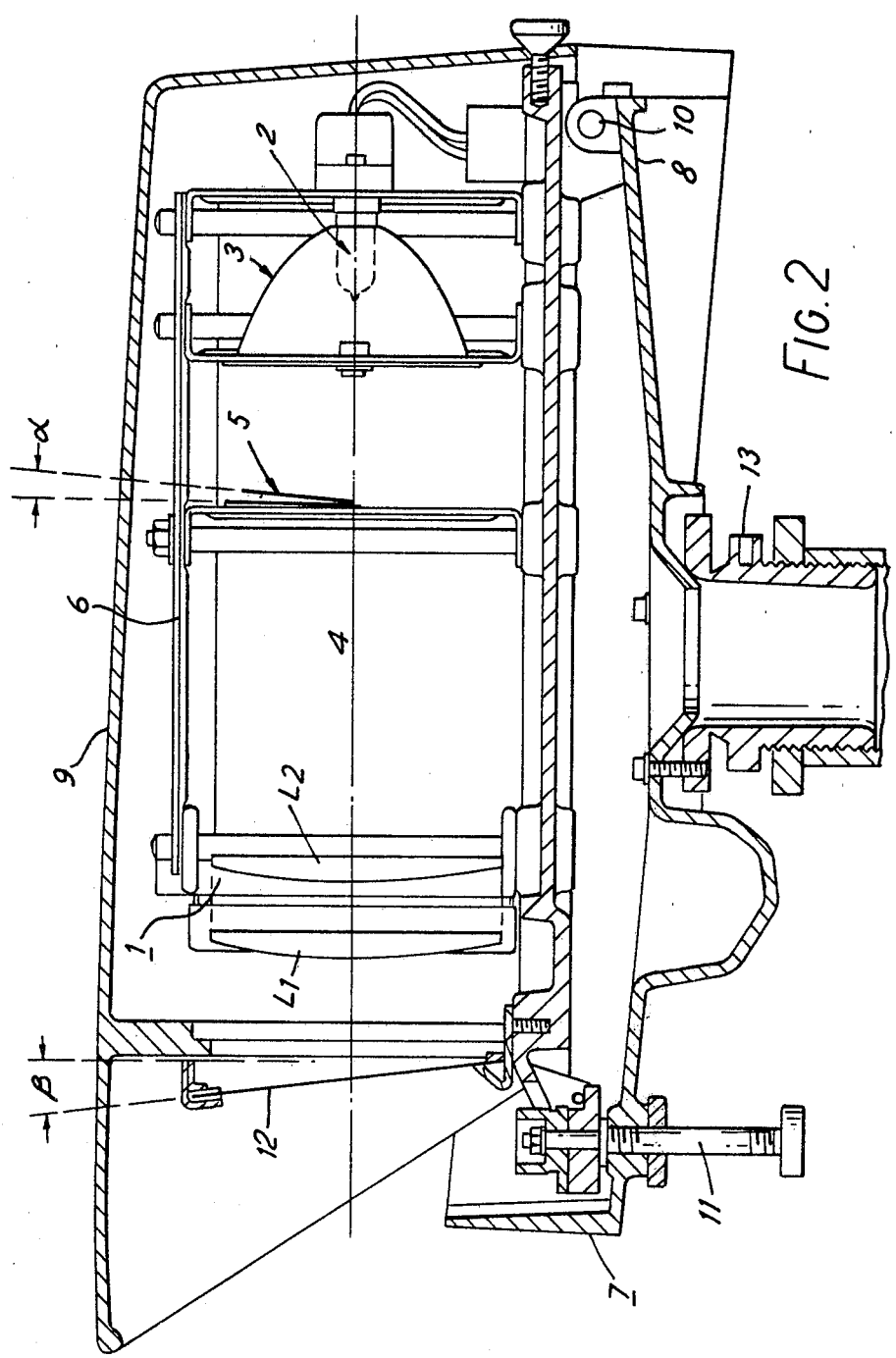
FIG. 2 shows, in more detail, the view represented schematically by FIG. 1.

The lighting unit has a compound lens 1, which in the illustrated embodiment is formed of two plano-convex lenses $L_1$ and $L_2$. Alternatively either a single lens or a triple lens could be used, a third lens $L_3$ being represented in dotted outline in FIG. 1. The unit also comprises a light source 2 which may be a tungsten halogen lamp, an ellipsoidal reflector 3 having the light source at its primary focus which is positioned on the optical axis 4 of the lens, and a colour filter 5 positioned between the lens and the light source. These components of the lighting unit are supported in their respective positions by a framework 6 so that light emerging from lens 1 is projected as a divergent beam. The framework 6 is itself mounted within an external casing not shown in FIG. 1 and shown generally at 7 in FIG. 2. The casing is comprised of a lower part 8 to which the framework 6 is mounted and an upper part 9 which protects the optical components described above. The framework 6 is located at the rear of plate 8 by a hinge arrangement 10, and an adjustable screw 11 at the front of plate 8 allows the framework to be tilted so that the emergent light beam may be aimed upwards at a desired angle. A glass plate 12 depends from the upper part 9 of the casing and provides a window therein adjacent to the lens, through which a light may pass. The casing 7 may be supported at 13 on a suitable pedestal or tripod as required.

The filter 5 is a dichronic or interference filter. The filter is planar and is comprised of a plurality of optically thin layers of material deposited on the surface of a thin glass substrate. In this example of the invention the filter is rectangular, alternatively however the filter could be semicircular. The above-mentioned layers produce interference effects which combine to transmit a particular colour of light (e.g. red) and reflect the other colours. The filter 5 extends part way across the light path between the light source 2 and the lens 1 with one edge thereof perpendicular to the optical axis 4. The filter divides the light beam produced by the lighting unit into a coloured part and a white part with a transition region formed by the combination of some light rays which have passed through the filter with others which have not.

The filter 5 is tilted away from the lens 1 about the edge thereof lying closest to the optical axis of the lens, so that the surface of the filter is inclined at an angle $\alpha$ to a plane normal to the optical axis.

It has been found that by inclining the filter in this way the desaturation of the coloured part of the beam by extraneous white light, which occurred hitherto, is significantly reduced. Since the desaturating effect of the rays which do not pass through the filter is reduced, the observed transition region is narrowed considerably.

It has also been found that inclination of the filter 5 beyond approximately 8° can cause colour changes in the transmitted light since the effective optical thickness of the filter layers is greater, and this, in combination with increased edge effects, tends to broaden the observed transition region. For optimum performance, therefore, it is found to be preferable to limit the angle of inclination $\alpha$ to not more than 8°.

The minimum desirable angle of inclination on the other hand, is the minimum angle at which white light, which has been back-reflected from the lens 1 or glass plate 12 onto the filter 5, is reflected by the filter away from the optical axis so as not to pass through the lens along with the transmitted coloured light. This will depend on the relative dimensions of the unit, but for the unit shown in the drawing would be approximately 4°. Thus α is chosen to be 6°±2° for optimum performance.

A further reduction in desaturation is achieved by tilting the glass plate 12 through a suitable angle $\beta$ to a plane normal to the optical axis of the unit, the glass plate 12 being tilted in the opposite sense to the filter 5. The angle of tilt is chosen to reduce back reflections from the glass plate 12 which pass through the lens and are incident on the filter 5. In the unit shown in the drawing the angle $\beta$ is approximately 8°.

We claim:

1. In a glide path lighting system a lighting unit comprising:
   a lens
   a light source positioned on the optical axis of the lens,
   a planar interference filter extending part way across the light path between the light source and the lens and inclined at an angle to a plane normal to the optical axis,
   and means for supporting said lens, light source and filter in their respective positions.

2. A lighting unit according to claim 1 including a transparent plate and further supportive means for supporting the plate in front of the lens, which plate is also inclined at an angle to a plane normal to the optical axis of the lens.

3. A lighting unit according to claim 2 wherein the front plate is inclined in an opposite sense to the filter.

4. A lighting unit according to claims 1 to 3 where the angle of inclination of the filter is less than 8°.

5. A lighting unit according to claim 4 where the angle of inclination lies between 4° and 8°.

6. A glide path indication light for a glide path lighting system, the light including:
   (a) a lens;
   (b) a light source positioned on the optical axis of the lens and cooperating therewith to project a beam of light;
   (c) a planar interference filter extending part way across the light source and the lens and adapted to cause the light to project light which will be visible as a first colour which may be white when viewed from one direction and which will be visible as a second colour when viewed from another direction; and
   (d) means for supporting said lens, light source and filter in their respective positions, wherein the interference filter is mounted inclined at an angle to a plane normal to the optical axis to reduce desaturation of light of one colour by light of the other colour when viewed from a direction close to the transition between the two colours.

7. A glide path indication light for a glide path lighting system, the light including:
   (a) a lens;
   (b) a light source positioned on the optical axis of the lens and cooperating therewith to project a beam of light;
   (c) a dichroic filter extending part way across the light to divide the light produced by the lighting unit into a coloured part and a white part; and
   (d) means for supporting said lens, light source and filter in their respective positions, wherein the interference filter is mounted inclined at an angle to a plane normal to the optical axis to reduce desaturation of the coloured light by the white light when viewed from close to the transition therebetween.

8. A glide path indication light for a glide path lighting system, the light including:
   (a) a lens;
   (b) a light source positioned on the optical axis of the lens and cooperating therewith to project a beam of light;
   (c) a dichroic filter extending partway across the light and positioned to divide the projected beam into a coloured part and a white part; and
   (d) means for supporting said lens, light source and filter in respective positions to provide said divided beam; wherein the interference filter is mounted at an inclination of between 4° and 8° to a plane normal to the optical axis.

* * * * *